May 31, 1949.　　　　R. S. HUNTER　　　　2,471,750
PHOTOELECTRIC GLOSSMETER

Filed Feb. 20, 1948　　　　　　　　　　2 Sheets-Sheet 1

Inventor:
Richard S. Hunter,
By Pierce, Scheffler & Parker,
Attorneys.

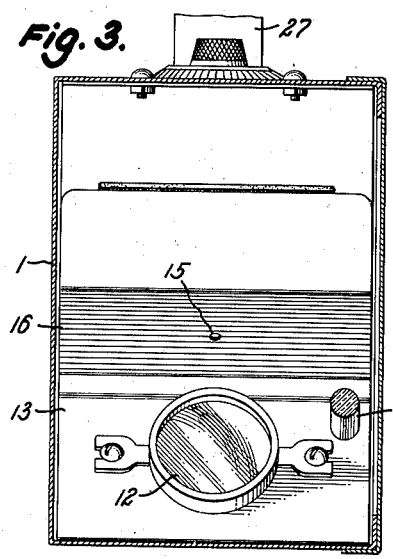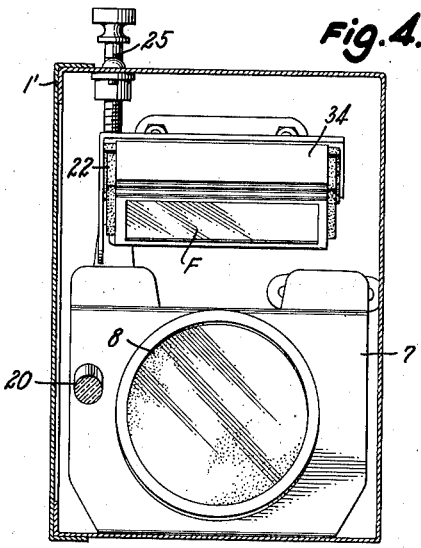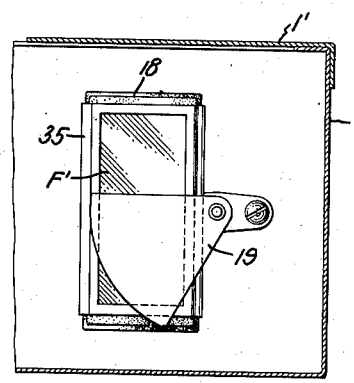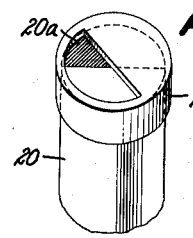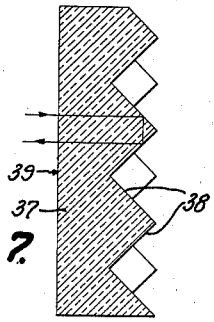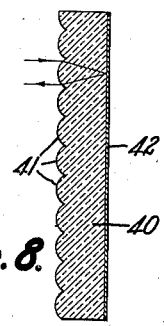

Patented May 31, 1949

2,471,750

UNITED STATES PATENT OFFICE 2,471,750

PHOTOELECTRIC GLOSSMETER

Richard S. Hunter, Franklin Park, Va., assignor to Henry A. Gardner Laboratory, Inc., Bethesda, Md., a corporation of the District of Columbia Application February 20, 1948, Serial No. 9,910

6 Claims. (Cl. 250—41.5)

This invention relates to a photoelectric glossmeter and more particularly to a glossmeter for measuring the property of a surface, of plane or of irregular configuration, to reflect light.

Studies of the capacity of surfaces to reflect light specularly are important in evaluating mirrors and reflectors for efficiency, and in rating non-metallic materials for gloss and lustrous appearance. Changes in the specular reflection of surfaces are of interest in the study of their resistance to wear or abrasion, to attack by acid or corrosive gases, to weather and/or to other destructive agencies and forces.

In general, the capacity of any surface to reflect light can be divided into two components. One component consists of specular reflectance, or capacity to reflect rays in the direction of mirror reflection. The other component, diffuse reflectance, consists in capacity to reflect rays uniformly in all directions. In the prior apparatus for measuring specular reflectance, a fairly narrow beam of rays is projected onto a surface, and the rays of this beam reflected in the direction of mirror reflection are gathered for measurement relative to the beam of rays incident upon the surface. In making such measurements, it is necessary that insofar as possible the diffusely reflected rays be kept from the light responsive mechanism which responds to specularly reflected rays.

When the surfaces of objects being measured or intercompared for specular reflectance are flat and are each brought to the same position relative to the illuminating beam and light responsive mechanism, it is possible to focus the beam of specularly reflected rays on a small aperture window. Only a very few diffusely reflected rays will pass through such a window and thus the specularly reflected rays are effectively separated from the diffusely reflected rays.

On the other hand, when the surfaces of the specimen objects are curved or wavy, the specularly reflected rays are deflected by the surface curvatures in amounts and directions that vary with the amount and character of surface curvature. The glossmeters of prior types are not suitable for gloss measurements on such objects since many of the specularly reflected rays are deflected away from the aperture window and the response obtained from the light sensitive mechanism is a function of surface curvature as well as of specular reflectance.

With many objects possessing curved and wavy surfaces, nevertheless, gloss and specular reflectance are factors for which measurement and control are needed. Automobile bodies, radio cabinets, ceramic dishes and porcelain objects are some of the materials of commerce having curved or wavy surfaces whose specular reflectances are of practical interest because of appearance and other factors.

An object of the present invention is to provide gloss-measuring apparatus in which the prior inaccuracies in gloss or lustrous appearance measurements are substantially eliminated. Objects are to provide apparatus for the measurement of the gloss or specular reflectance of curved as well as flat surfaces. Objects are to provide glossmeters of the type stated which include elements adjustable to compensate for diffuse reflection from the surface under investigation and for stray light arising from the imperfect operation of elements of the optical system, whereby the measured values are developed solely by the specularly reflected light rays. Other objects are to provide a photoelectric glossmeters in which the light beam is twice reflected from either a plane or irregular surface and then imposed upon a photoelectric element of a measuring or comparison circuit.

These and other objects and the advantages of the invention will be apparent from the following specification when taken with the accompanying drawings in which.

Figure 1:
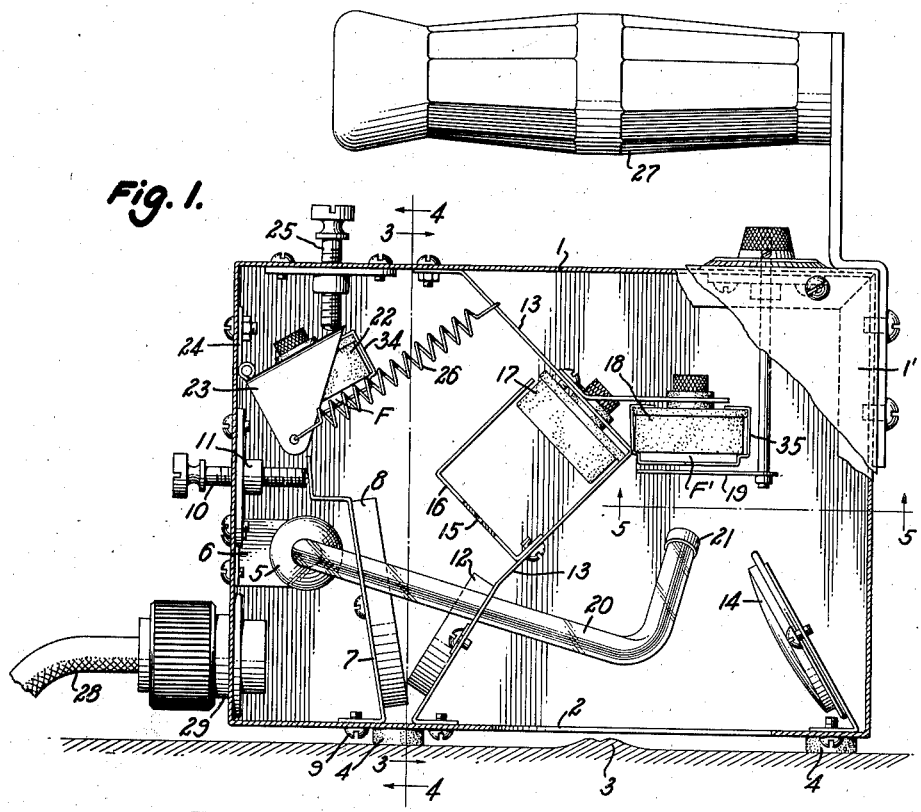
Fig. 1 is a side elevation of an exposure head of a photoelectric glossmeter embodying the invention, with substantially the entire side wall broken away for a better view of the optical and photoelectric elements.

Figs. 3 and 4 are sections taken on the same transverse plane of Fig. 1 and looking in the directions indicated by arrows 3—3 and 4—4, respectively;

Fig. 5 is a fragmentary section taken on line 5—5 of Fig. 1;

Fig. 6 is a perspective view, on an enlarged scale, of the end of a transparent light guide and its adjusting cap; and Figs. 7, 8 and 9 are schematic sections of different types of retroreflectors which may be employed in the exposure head.

In the drawings, the reference numeral 1 identifies a sheet metal housing of rectangular form with a removable side wall 1', having a dull black non-reflecting coating on its inner walls, the housing being light-tight except for an elongated opening 2 through the botom wall which is to be placed upon or over the surface of an object 3 under investigation. Short legs or bushings 4 are secured to the lower wall for supporting the housing upon or against an object of extended area, or for supporting the housing upon a table in the event that the test objects are in the form of small sheets or plates which are placed upon the table.

An incandescent lamp 5 with a small coiled filament is supported by a socket 6 which is mounted in one end of the housing 1 and separated from the opening 2 by an apertured plate or diaphragm 7 upon which is mounted a beam-splitter 8, i. e., a thin plastic film upon which a transparent light-reflecting film of metal is deposited. The lower flange of the diaphragm plate 7 is secured to the bottom wall of the housing by screws 9, and the angular arrangement of the beam-splitter 8 may be adjusted by screws 10 which are threaded into bushings 11 fixed to an end wall of the housing 1, the diaphragm plate being resilient and adjusted clockwise by turning in the adjusting screws 10. The major portion of the light beam through the aperture of the diaphragm plate 7 passes through a lens 12 mounted upon a partition plate 13 which extends from one side wall to the other of the housing 1 and, as will be explained later, a correction is made for stray light resulting from dust in the beam-splitter 8 and imperfect absorption of the black painted elements adjacent to the beam-splitter.

The lens 12 projects the light beam upon the surface of the test object 3, and a retroreflector 14 of one of the types widely used on highway signs and truck markers is mounted within the housing 1 to receive the light beam specularly reflected from the surface of the test object. The retroreflector 14 is of relatively large surface area to intercept all light rays specularly reflected from the surface, whether plane, curved or wavy, of the test object 3. Each light ray reversed in direction by the retroreflector 14 returns to strike that portion of the test surface from which it was initially reflected, and that part of the returned ray which is specularly reflected a second time from the test surface returns over its initial path through the lens 12 towards the lamp 5. Part of the beam of returning rays is reflected laterally, however, by the flat beam-splitter 8 to form a twice-specularly reflected beam of rays converging upon a small aperture 15 of a partition wall 16 which is secured to and cooperates with the main partition 13 to form a casing for a current-generating photoelectric cell 17. An image of the filament of the lamp 5 is formed at the aperture, although in practice this image is somewhat blurred by failure of the retroreflector exactly to reverse each ray striking it and possibly also by the manner in which the surface of the test object 3 blurs the specularly reflected beam. The electrical response of the photoelectric cell 17 is of course proportional to the intensity of the light beam which reaches the cell through the aperture 15.

The major portion of this light beam is the twice-specularly reflected beam of rays, and a more or less accurate measurement of the specular reflection characteristics of the test objects may be had with the elements, as so far described, of the gloss-measuring apparatus. However, and as illustrated, additional elements are preferably provided to compensate for diffuse reflection from the test surface and for stray light.

Some light rays which are diffusely reflected from the surface of the test object 3 will travel along the same paths as the specularly reflected rays and thus will pass through the aperture 15 to impinge upon the "test" photoelectric cell, and such diffusely reflected rays would, if not compensated, result in a too high indication of the gloss of a white or light colored test object. Fortunately, however, the light diffusely reflected from a surface is characterized by the fact that its spread or distribution from the reflecting surface is quite uniform in all directions. It is therefore possible to develop a current proportional to diffuse reflection by a "compensating" photoelectric cell 18 positioned within the housing above the opening 2 and test object 3. As will be explained later, the current output of the cell 18 is subtracted from the current output of the test photoelectric cell 17, and the magnitude of the compensating current component may be adjusted by turning a vane 19 to shield more or less of the photocell 18 from light reflected from the object 3.

The beam-splitter 8 is positioned closely adjacent the aperture 15 through which light rays pass to the test photoelectric cell 17. The illumination of the beam-splitter by light coming from the lamp 5 is much greater than that due to light returning from the test surface. Some stray light is reflected towards the photoelectric cell 17, both from dust particles on the beam-splitter and from imperfect absorption of the black painted elements adjacent to the beam-splitter. If not compensated, this stray light will result in an inaccurate and too high indication of the gloss of the test object. Compensation may be effected by illuminating the compensating photocell 18 to develop a current component equal to that resulting from the stray light illumination of the test photocell 17, for example, by means of a transparent plastic rod 20 which extends through the diaphragm plate 7 and partition 13 to transmit light from the lamp 5 to the photocell 18. The inlet end of the rod adjacent the lamp 5 is of such area as to collect substantially more light rays than may be required to compensate for stray light incident upon the test photocell 17, and the light transmitted to the photocell is reduced to appropriate value by appropriate adjustable means. The rod 20 is preferably of circular cross-section and it is convenient to adjust the light transmission by applying an opaque paint 20a to one-half the outlet end of the rod, and rotatably mounting upon that end a cylindrical cap 21 having a semi-circular opening through its end wall, see Fig. 6.

If means, not shown, are provided for energizing the lamp 5 to establish a constant intensity light beam, the differential electrical outputs of the test photocell 17 and the compensating photocell 18 will afford a measure of the gloss of the test object. It is preferable, however, to avoid errors arising from variations in the brilliance of the lamp 5 by providing a "comparison" photocell 22 to receive light rays directly from the lamp 5, and measure the gloss of the specimen in terms of the ratio of the intensity of the specularly reflected light to that of the light beam incident upon the comparison photocell 22. The photocell is mounted upon a bracket 23 hinged to a strap 24 secured to an end wall of the housing, the bracket and photocell being adjustable clockwise by a pressure screw 25 against the force exerted by a spring 26.

The housing 1 is preferably a relatively small casing which is freely movable by means of a handle 27, and encloses only the optical and photoelectric elements of the glossmeter. Circuit connections to the lamp 5 and to the photocells are established through a cable 28 detachably secured to a cable connector 29 mounted on the housing 1.

Figure 2:
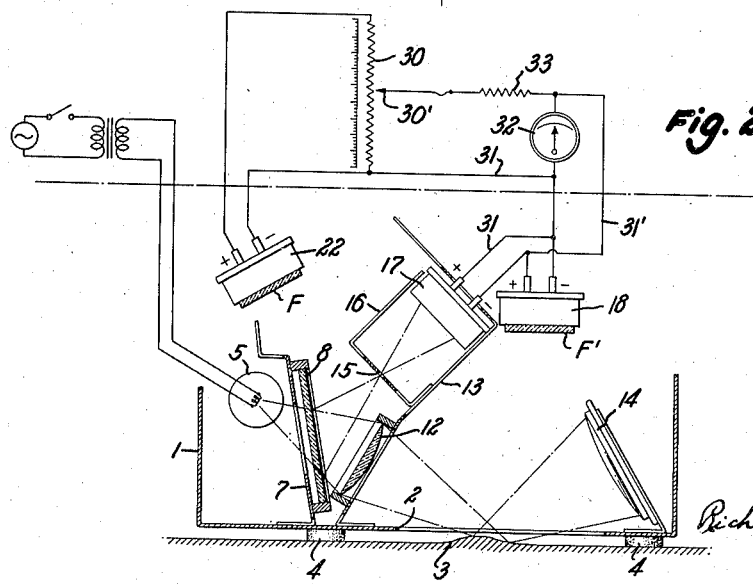
Fig. 2 is a schematic view of the same elements, with the energizing and measuring circuits added.

The measuring circuit is schematically shown in Fig. 2 as a graduated slide wire resistance or potentiometer 30 of the order of 100 ohms connected across the comparison photocell 22, and a "bucking" circuit connection of the test photocell 17 across the sliding tap 30' and one terminal of potentiometer 30 by leads 31, 31'. A sensitive galvanometer 32 is connected across the leads 31, 31', and a resistor 33 of the order of 8,000 ohms is included in lead 31' between the potentiometer tap 30' and the galvanometer 32. The compensating photocell 18 is connected across the leads 31, 31' from photocell 17 in such sense, as indicated by the polarity symbols, that the current output of the compensating photocell 18 is subtracted from the current output of the test photocell 17.

A heat-absorbing glass filter F is mounted over the comparison photocell 22 by a resilient clip or frame 34, since the photocell is closely adjacent and continuously brilliantly illuminated by the lamp 5 during use of the glossmeter. A similar filter F' may be mounted over the compensating photocell by a resilient frame 35 to reduce the illumination on photocell 18 to approximately the proper level for compensation.

The apparatus is adjusted for accurate measurements of specular reflectance by placing the housing 1 over the opening of a so-called black box, setting the tap 30' of potentiometer 30 to exclude all of the potentiometer resistance and then adjusting the rotatable cap 21 on the light-transmitting rod 20 to obtain a zero reading at instrument 32. This adjustment corrects for stray light reaching photocell 17 from lamp 5 by inadvertent reflection or diffusion from the beam-splitter 8. The removable side wall 1' is then secured in place; the housing 1 is placed over a panel having a matte surface coating, for example of a casein paint, which has substantial zero specular reflectance. Some light rays diffusely reflected from the matte surface will usually reach the test photocels 17, and the compensation for such diffuse reflection is effected by adjusting the vane 19 to obtain a zero reading on the instrument 32. The housing 1 is then placed over a panel or glass plate of known reflectance or gloss, the tap 30' of potentiometer 30 is set at the scale graduation of the known reflectance, and screw 25 is adjusted to move the bracket 23 and the compensating photocell 22 into such position that the instrument reading is zero. These are factory or shop adjustments which, in general, remain good until the lamp 5 burns out and is replaced by a new lamp.

The exposure head or housing 1 is placed over the article or surface under investigation, and the potentiometer tap 30' is adjusted to bring the pointer of the galvanometer 32 to its central or zero position. The gloss or specular reflectance is then read from the graduated scale of the potentiometer 30. It is to be noted that this scale is not linear but square law, since the light rays which reach the test photocell are those which were twice reflected from the test surface. Small differences in gloss are thus readily detected, but in spite of this unusually high sensitivity, it is not necessary that the test surface be flat or that it be accurately positioned with respect to the optical system to obtain accurate readings of specular reflectance or gloss. The new glossmeter is useful, for example, in measuring the gloss of curved reflectors such as employed in headlights and searchlights.

A number of types of retroreflectors are commercially available for use in glossmeters embodying the invention, and the accuracy of the gloss measurements depends upon the type of retroreflector which is employed. One known type, as illustrated in Fig. 7, consists of a molded plate 37 of clear plastic, usually methyl methacrylate, comprising a web of cube corners 38 behind a flat outer surface 39, each cube corner being arranged with its apex behind the center of its base. This retroreflector is the most accurate and efficient type of retroreflector now manufactured commercially, but each light ray striking within a cube corner is displaced laterally within the cube corner before the ray emerges travelling in reversed direction. The returned ray thus strikes the test surface at a point slightly displaced from that at which it was originally reflected, and the measured indication of specular reflection is thus less accurate than may be obtained when the returned light rays are incident upon the points of original reflection. The displacement is not as great as is indicated by the illustrated path of a typical ray, since Fig. 7 is drawn to an enlarged scale. The cube-corner type of retroreflector has the advantage, as compared with other retroreflectors, of a highly efficient light transmission and it therefore is advisable to use such a retroreflector in investigations of the gloss of non-metallic surfaces.

Other types of commercially available retroreflectors which afford a somewhat higher accuracy in the measurement of high reflectance are illustrated schematically in Figs. 8 and 9. For non-metallic materials having relatively low specular reflectance, however, these retroreflectors are generally unsuitable because of the very small fraction of the incident light beam which eventually reaches the test photocell even when the surface under investigation is of high gloss for the particular material of the specimen object. As illustrated in Fig. 8, the retroreflector comprises a thin and somewhat flexible sheet 40 of a transparent plastic having an outer surface 41 of minute lenticular form, the diameter of the small convex lens elements being of the order of 0.02 inch, and a smooth rear surface upon which a reflecting metallic film 42 of aluminum is deposited. The mean lateral deflection of the light rays which are reversed in direction by this lens plate type of retroreflector is substantially less than that of the cube-corner type in which the pitch or width of the cube corners may be of the order of from 0.16 to 0.095 inch. A further commercial type of retroreflector, as shown in Fig. 9, is of flexible sheet or film form and has somewhat the same construction as a fine sandpaper. In place of granules of sand or other abrasive, the outer surface of the retroreflector comprises minute glass beads 43 of a diameter of the order of a few mils, embedded in a thin flexible film 44 of a transparent plastic which is backed by a deposit or coating 44 of a metal or metallic varnish.

For a gloss measuring or control apparatus of general utility, it is preferable to employ the cube-corner type of retroreflector of Fig. 7 to obtain the high sensitivity which is essential for the measurement and/or comparison of the gloss of non-metallic materials, but for apparatus for use in the study of the gloss of only metallic surfaces, it is preferable to employ retroreflectors of the types which effect a lesser displacement of the reversely returned light rays.

Apparatus embodiments of the invention afford measurements of the gloss or specular reflectance of plane surfaces and of curved, wavy or otherwise irregular surfaces. Other arrangements have been proposed and used for the measurement of the gloss of plane surfaces but the invention is distinguished from such prior arrangements in that it affords compensation for stray light and diffuse reflection from plane surfaces, and in addition, it affords for the first time accurate measurement of the specular reflectance of non-planar surfaces.

It is to be understood that the invention is not restricted to the particular apparatus herein shown and described since various changes in the several parts, their sizes, shapes and relative locations fall within the spirit and scope of the invention as set forth in the following claims.

I claim:

1. In a glossmeter, a source of light, optical means for twice reflecting light rays from said light source from the surface of a test object, and a measuring system including a photoelectric device positioned in the path of the light rays twice reflected from the test object, and a second photoelectric device to compensate for light rays reaching said first photoelectric device along paths other than those of the twice reflected light rays.

2. In apparatus for investigating the specular reflectance of a test object, the combination within a housing having an opening for positioning on or over the test object, of a light source, optical means for directing a light beam through said housing opening and upon the surface of the test object, a retroreflector positioned to intercept light rays specularly reflected from the test object and to reverse the direction thereof to return the same to the test object, a test photoelectric cell, and means for impressing upon said photoelectric cell light rays returned to the test object and specularly reflected therefrom.

3. In apparatus for investigating the specular reflectance of a test object, the invention as recited in claim 2, wherein said last mentioned means comprises a beam-splitter in the path of the light beam to said housing opening, said beam-splitter having a transparent reflective coating for directing towards said test photoelectric cell the light rays returned by said retroreflector to and specularly reflected from the test object.

4. In apparatus for investigating the specular reflectance of a test object, the invention as recited in claim 3, in combination with means including a second photoelectric cell to compensate for diffuse reflection from the test object.

5. In apparatus for investigating the specular reflectance of a test object, the invention as recited in claim 3, in combination with means adjustable to compensate for stray light incident upon said test photoelectric cell.

6. In apparatus for investigating the specular reflectance of a test object, the invention as recited in claim 5, wherein said adjustable compensating means includes a light-transmitting rod having an inlet end adjacent said light source and an outlet end directed towards said compensating photocell, and means adjustable to vary the light transmission through said rod to said compensating photocell.

RICHARD S. HUNTER.

No references cited.